US012756932B2

(12) United States Patent
Nakamura

(10) Patent No.: US 12,756,932 B2
(45) Date of Patent: Oct. 6, 2026

(54) IMAGING APPARATUS

(71) Applicant: CANON KABUSHIKI KAISHA, Tokyo (JP)

(72) Inventor: Hiroshi Nakamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 19/062,579

(22) Filed: Feb. 25, 2025

(65) Prior Publication Data

US 2025/0193521 A1 Jun. 12, 2025

Related U.S. Application Data

(63) Continuation of application No. 18/300,283, filed on Apr. 13, 2023, now Pat. No. 12,262,116.

(30) Foreign Application Priority Data

Apr. 27, 2022 (JP) ................................ 2022-073272

(51) Int. Cl.
*H04N 23/68* (2023.01)
*G06F 3/01* (2006.01)

(52) U.S. Cl.
CPC .......... *H04N 23/684* (2023.01); *G06F 3/016* (2013.01)

(58) Field of Classification Search
CPC ........ H04N 23/45; H04N 23/60; H04N 23/62; H04N 23/67; H04N 23/684; H04N 23/70; H04N 25/62; H04N 25/77; G06F 3/016
See application file for complete search history.

(56) References Cited

U.S. PATENT DOCUMENTS 8,581,877 B2 * 11/2013 Yoo ...................... G06F 1/1671 345/173
10,198,075 B2 * 2/2019 Sato ........................ G06F 3/041
2012/0009896 A1 * 1/2012 Bandyopadhyay .......................... H04M 1/724631 715/764

* cited by examiner

*Primary Examiner* — Lin Ye
*Assistant Examiner* — Chriss S Yoder, III
(74) *Attorney, Agent, or Firm* — Canon U.S.A., Inc. IP Division

(57) ABSTRACT

An imaging apparatus includes a vibration device and a control substrate for outputting vibration. The control substrate controls the vibration device to vibrate during a period including a readout period of an image signal from an imaging device in an image capturing sequence. A vibration direction of the vibration device is arranged so as to be parallel with a direction of a readout wiring line (vertical signal line) of the imaging device.

8 Claims, 7 Drawing Sheets

IMAGING APPARATUS

CROSS-REFERENCE TO RELATED APPLICATIONS

This application is a Continuation of co-pending U.S. patent application Ser. No. 18/300,283 filed Apr. 13, 2023, which claims the benefit of priority from Japanese Patent Application No. 2022-073272, filed Apr. 27, 2022, all of which are hereby incorporated by reference herein in their entireties.

BACKGROUND

Field of the Disclosure

The present disclosure relates to an imaging apparatus including a vibration device and mounted on a digital camera, a smartphone, or other devices.

Description of the Related Art

As such an imaging apparatus, Japanese Patent Application Laid-open No. 2011-114543 discusses a technique of discriminating a vibration generated by a vibration element when an image is read out from an image sensor (imaging device), and reducing noise by post-processing.

In the above described technique, however, Japanese Patent Application Laid-open No. 2011-114543 discusses a method of removing noise from a captured image in a state where the noise is contained, and does not discuss a technique of reducing noise generated when an image is captured.

SUMMARY

Aspects of the disclosure provide for an imaging apparatus, including a vibration device, capable of reducing an influence of image noise generated due to a vibration while an image is captured.

According to an aspect of the present disclosure, an imaging apparatus includes an imaging device, an operation unit configured to instruct an image capturing start of the imaging device, a vibration device, a control unit configured to feedback a tactile sensation to a user by operating the operation unit to vibrate the vibration device, and a plurality of readout wiring lines configured to read out information from pixels in the imaging device. In a case where the control unit performs a feedback control of the tactile sensation using the vibration device during a readout period of an image signal from the imaging device in an image capturing sequence, the readout wiring lines are arranged in a direction parallel with a vibration direction of the vibration device.

Further features of the present disclosure will become apparent from the following description of embodiments with reference to the attached drawings.

DESCRIPTION OF THE EMBODIMENTS

Hereinbelow, embodiments of the present disclosure will now be described with reference to the attached drawings.

External Appearance of Digital Camera

Figure 1A:
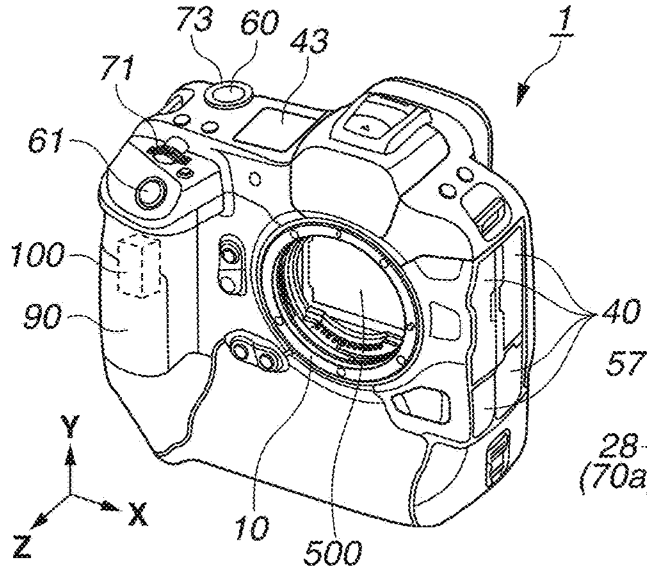
FIGS. 1A and 1B are perspective views illustrating an appearance of an imaging apparatus.
Figure 1B:
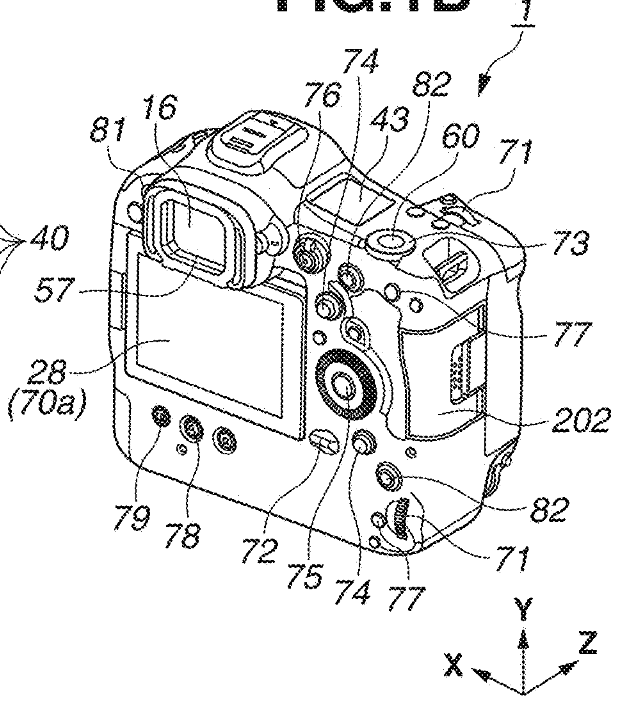

FIGS. 1A and 1B illustrate an external appearance of a digital camera 1 as an example of an imaging apparatus to which the present disclosure is applicable.

FIG. 1A is a perspective of the front side of the digital camera 1. FIG. 1B is a perspective of the back side of the digital camera 1.

In FIGS. 1A and 1B, a display unit 28 is a display unit provided on the back side of the digital camera 1 to display an image and various kinds of information.

A touch panel 70*a* can detect a touch operation onto a display surface (operation surface) of the display unit 28.

Figure 2:
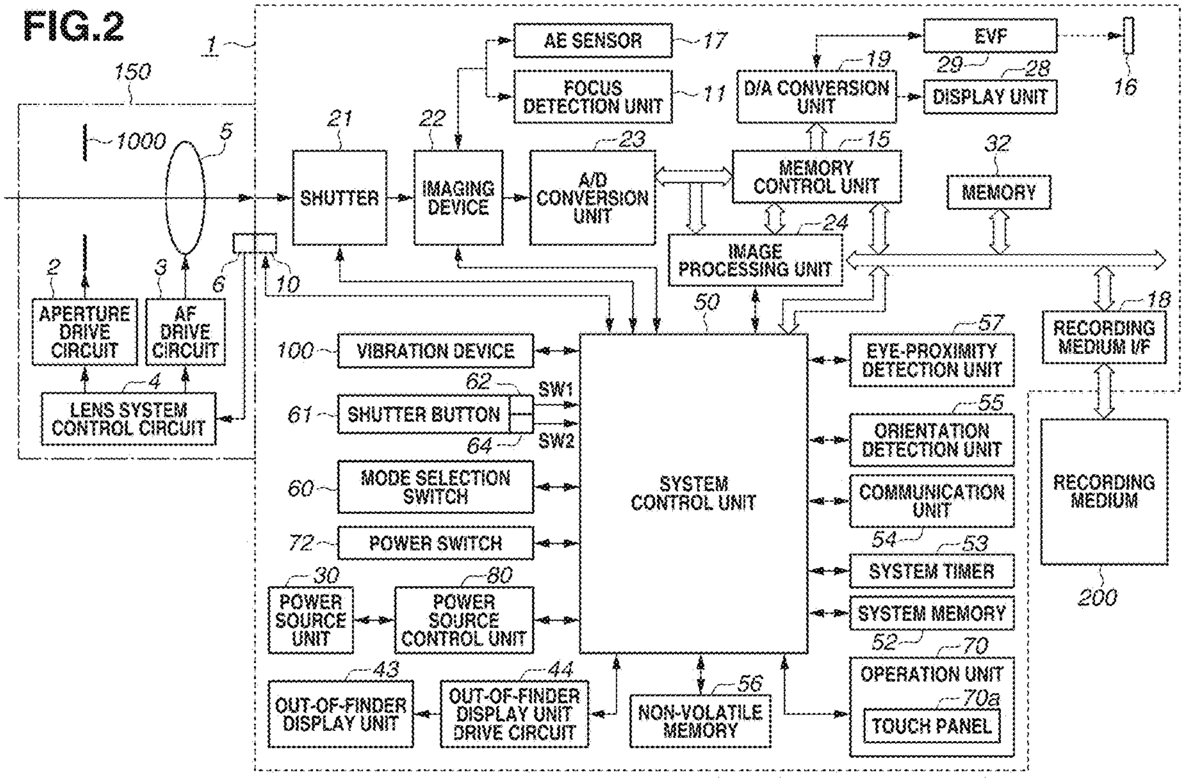
FIG. 2 is a block diagram illustrating a configuration of the imaging apparatus.

An out-of-finder display unit 43 is a display unit provided on an upper surface of the digital camera 1 to display various setting values of the digital camera 1, such as a shutter speed and an aperture 1000 (see FIG. 2).

A shutter button 61 is an operation unit to perform an image capturing instruction and is a switch including two-step detection positions in a pressing direction.

An auto-focus (AF) operation is performed with a first step on-detection of the switch, and an image capturing operation is performed with a second on-detection the switch when the switch is further pressed from the first step.

Using a function of customizing the operation button (shutter button 61), the operation of the camera with the first step on-detection can be changed, and for example, an automatic exposure (AE) function can be operated without an auto-focus function being operated.

A mode selection switch 60 is an operation unit for switching between various modes.

Terminal covers 40 are covers for protecting connectors (not illustrated) for connection cables to connect, for example, an external apparatus and the digital camera 1.

An electronic main-dial 71 is a rotational operation member included in an operation unit 70 (see FIG. 2). A shutter speed or setting values of, for example, the aperture 1000 can be changed by rotating the electronic main-dial 71.

A power switch 72 is an operation member for switching power on/off of the digital camera 1.

An electronic sub-dial 73 is a rotational operation member included in the operation unit 70. The electronic sub-dial 73 is used to move a selection frame or advance an image.

A multi-direction key 74 is included in the operation unit 70. The multi-direction key 74 is a multi-direction key (8 direction key) operable in 8 directions, such as up, down, left, right, upper right, lower right, lower left, and upper left direction. The multi-direction key 74 can instruct the digital camera 1 to perform an operation corresponding to a pressed direction of the multi-direction key 74.

A set button 75 is a press button included in the operation unit 70, and mainly used for determining a selected item.

A video button 76 is used to issue a moving-image capturing (recording) start/stop instruction. An AE lock button 77 is included in the operation unit 70. It is possible to fix an exposure state by pressing the AE lock button 77 in an image capturing standby state.

A zoom button 78 included in the operation unit 70 is an operation button for switching on/off of a zoom mode in a live-view (LV) display in an image capturing mode.

By operating the electronic main-dial 71 after switching the zoom mode on, an LV image can be enlarged or reduced.

In an image reproduction mode, the zoom button 78 functions as a zoom button for enlarging the reproduced image to increase an enlargement ratio.

A reproduction button 79 included in the operation unit 70 is an operation button for switching between the image capturing mode and the image reproduction mode.

By pressing the reproduction button 79 in the image capturing mode, the mode shifts to the image reproduction mode, and a latest image among images recorded in a recording medium 200 (see FIG. 2) can be displayed on the display unit 28.

A menu button 81 is included in the operation unit 70, and when the menu button 81 is pressed, a menu screen with which various settings can be made is displayed on the display unit 28.

A user can intuitively make various kinds of settings using the menu screen displayed on the display unit 28, the multi-direction key 74, and/or the set button 75.

A camera side communication terminal 10 is a communication terminal for the digital camera 1 to communicate with a lens side (attachable/detachable).

An eyepiece portion 16 is an eyepiece portion for an eyepiece finder (look-in type finder). A user can visually recognize an image displayed on an electronic viewfinder (EVF) 29 (see FIG. 2) via the eyepiece portion 16.

An eye-proximity detection unit 57 is an eye-proximity detection sensor located in an inner portion of the eyepiece portion 16. The eye-proximity detection unit 57 detects whether a user's eye is in close proximity with the eyepiece portion 16.

A cover 202 is a cover for a slot in which the recording medium 200 is mounted. A front grip portion 90 is a holding portion configured to have a shape easy-to-grip with a user's right hand when a user holds the digital camera 1 to capture an image.

A vibration device 100 is attached inside the front grip portion 90.

The vibration device 100 for tactile sensation feedback control generates various kinds of vibrations depending on an image capturing situation described below to apply the vibrations to the front grip portion 90.

The vibration device 100 according to the present embodiment is a haptics element.

The haptics is a technology of giving a skin sensation (tactile sensation) feedback to a user by applying force, vibration, and movement. The technology is also referred to as a haptics technology.

The vibration device 100 is a vibration device, such as a linear actuator (LRA) type vibration device, a piezoelectric element type vibration device, or a voice coil (VC) motor type vibration device. It is possible to make variable settings of vibration parameters for a vibration intensity (vibration amplitude), and a vibration frequency, for example.

By changing the vibration parameters, the vibration device 100 can generate various vibration patterns.

The shutter button 61 and the electronic main-dial 71 are arranged each at a position operable by an index finger of the user's right hand, in a state where the user holds the front grip portion 90 with a little finger, a ring finger, and a middle finger of the user's right hand.

The multi-direction key 74 and the electronic sub-dial 73 are also arranged each at a position operable by a thumb of the user's right hand in the same holding state.

Figure 1C:
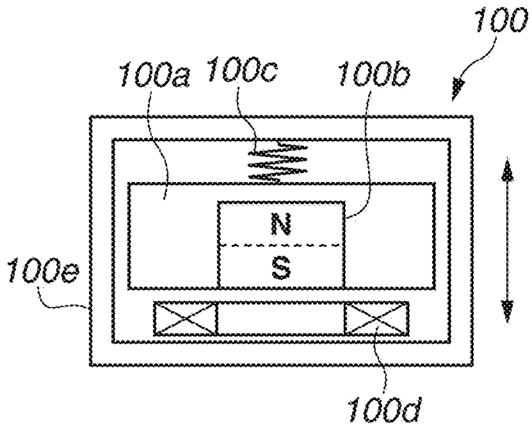
FIG. 1C is a diagram illustrating a configuration of a laser gyro reference axis (LRA) type vibration device.

A description will now be given of an LRA type vibration device as an example of the vibration device 100 attached to the front grip portion 90, with reference to FIG. 1C.

The LRA type vibration device 100 includes a vibration element 100*a*, a magnet 100*b*, a spring 100*c*, a coil 100*d*, and a base 100*e*.

The vibration element 100*a* holds the magnet 100*b* and is movably connected to the base 100*e* with the spring 100*c*.

Figure 3A:
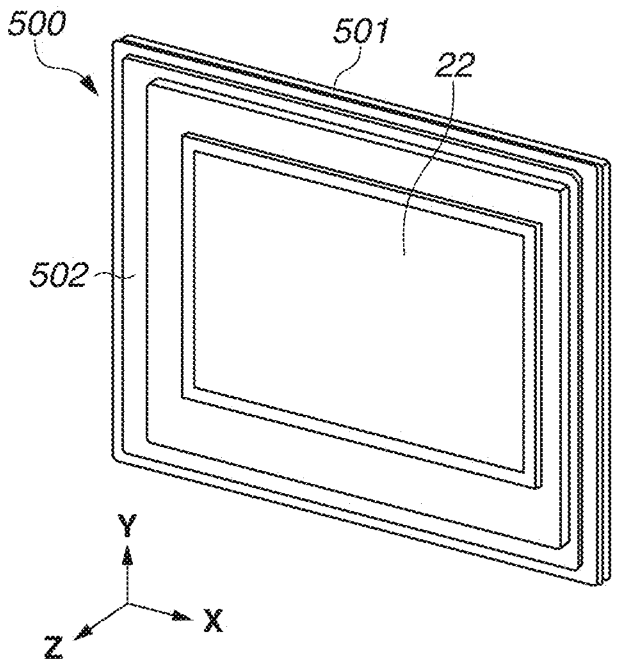
FIGS. 3A, 3B, 3C, 3D, and 3E are diagrams schematically illustrating an imaging device and readout wiring lines.
Figure 3B:
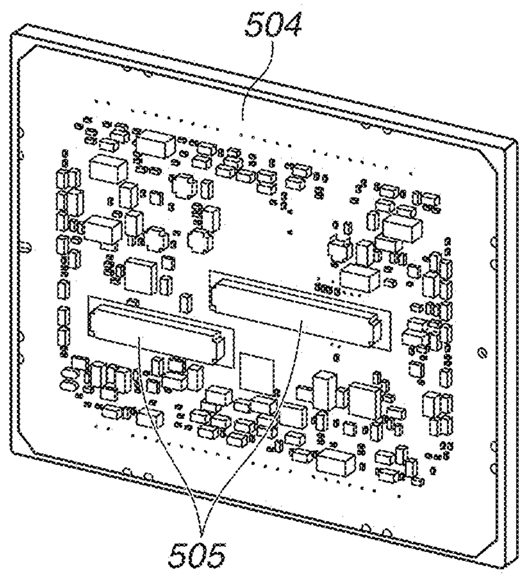

The coil 100*d* is located near the magnet 100*b*, and electrically connected to a circuit board (see FIG. 3B).

The coil 100*d* generates an electromagnetic force by a current supplied from the circuit board. The electromagnetic force causes an attraction force or a repulsive force between the coil 100*d* and the magnet 100*b* to bring a reciprocating movement of the vibration element 100*a*, and thereby a vibration is generated in the vibration device 100 in an arrow direction illustrated in FIG. 1C.

Figure 1D:
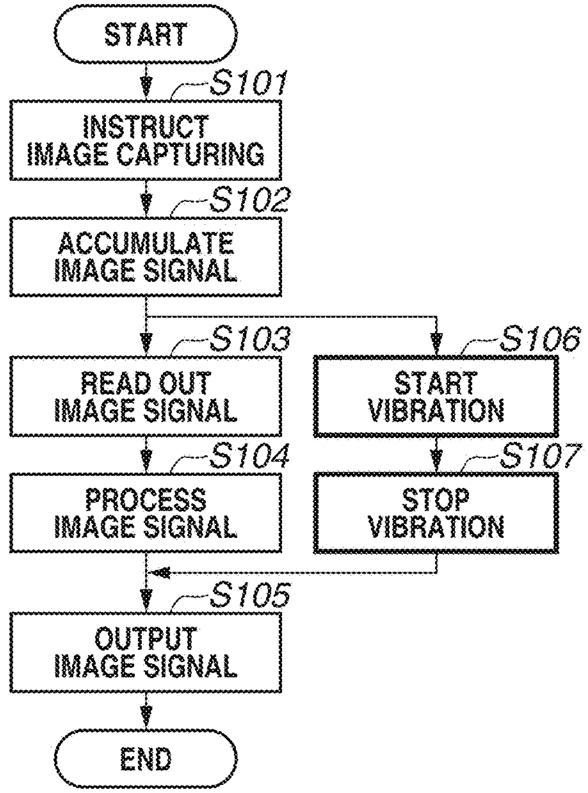
FIG. 1D is a flowchart.

FIG. 1D is a flowchart illustrating a vibration control processing flow of an imaging device (complementary metal-oxide semiconductor (CMOS) sensor) 22 and the vibration device 100 according to the present embodiment.

In step S101, a user presses the shutter button 61 to instruct an image capturing. In step S102, the imaging device 22 including a circuit described below starts accumulating an image signal (charges corresponding to an image).

In step S103, when the accumulation is completed, an image signal readout starts.

When the image signal readout is completed, in step S104, the read out image signal is processed in an image processing unit 108 described below. In step S105, the read out image signal is output from an interface unit 110 including a memory unit 109 and an output unit 111 described below.

In step S106, the vibration device 100 starts vibrating at an approximately same timing as the timing at which the accumulation is completed in step S102. In step S107, the vibration device 100 stops vibrating at an approximately same timing as the timing at which the image processing is completed in step S104.

Block Diagram of Digital Camera

FIG. 2 is a block diagram schematically illustrating an example of a hardware configuration of the digital camera 1 according to the present embodiment.

In FIG. 2, a lens unit 150 is a lens unit including an interchangeable imaging lens.

A lens 5 is typically configured of a plurality of lenses, but in the present embodiment, the lens 5 is illustrated using only one lens to simplify the illustration of the lens 5.

A lens side communication terminal 6 is a communication terminal for the lens unit 150 to communicate with the digital camera 1 side. The camera side communication terminal 10 is a communication terminal for the digital camera 1 to communicate with the lens unit 150 side.

The lens unit 150 communicates with a system control unit 50 via the lens side communication terminal 6 and the camera side communication terminal 10.

A lens system control circuit 4 in the lens unit 150 controls the aperture 1000 via an aperture drive circuit 2, and controls the lens 5 via an AF drive circuit 3 to displace the position of the lens 5 to perform focusing.

An AE sensor 17 measures a luminance of an object via the lens unit 150.

A focus detection unit 11 outputs defocus amount information to the system control unit 50.

The system control unit 50 controls the lens unit 150 based on the defocus amount information to perform a phase difference AF. The focus detection unit 11 can be a dedicated phase difference sensor or can be configured as an imaging plane phase difference sensor in the imaging device 22.

A shutter 21 is a focal plane shutter that can arbitrarily control an exposure time of the imaging device 22 under the control of the system control unit 50.

The imaging device 22 is an image sensor configured of a charge-coupled device (CCD) sensor, the CMOS sensor, or the like.

An analog-to-digital (A/D) conversion unit 23 converts an analog signal into a digital signal. The A/D conversion unit 23 converts an analog signal output from the imaging device 22 into a digital signal.

An image processing unit 24 performs color conversion processing, and resize processing, such as predetermined pixel interpolation and size reduction, on the data received from the A/D conversion unit 23 or data received from a memory control unit 15.

The image processing unit 24 performs predetermined calculation processing using the captured image data.

Based on the calculation processing result obtained by the image processing unit 24, the system control unit 50 performs exposure control and ranging control.

More specifically, through-the-lens (TTL) method AF processing, AE processing, electronic flash preliminary emission (EF) processing are performed The image processing unit 24 further performs predetermined calculation processing using the captured image data to perform TTL method automatic white balance (AWB) processing, based on the obtained calculation processing result.

The data output from the A/D conversion unit 23 is written into a memory 32 via the image processing unit 24 and the memory control unit 15, or directly written into the memory 32 via the memory control unit 15.

The memory 32 stores the image data obtained by the imaging device 22 and converted into the digital data by the A/D conversion unit 23, and image data to be displayed on the display unit 28 or the EVF 29.

The memory 32 has a sufficient memory capacity to store a predetermined number of still images, and a predetermined time period of moving image and sound. The memory 32 also works as a memory for image display (video memory).

A digital-to-analog (D/A) conversion unit 19 converts the data for image display stored in the memory 32 into an analog signal, and supplies the converted analog signal to the display unit 28 or the EVF 29.

In this way, the image data for image display written in the memory 32 is displayed on the display unit 28 or the EVF 29 via the D/A conversion unit 19.

The display unit 28 and the EVF 29 perform display according to the analog signal received from the D/A conversion unit 19, on a liquid crystal display (LCD) or an organic electroluminescence (EL) display.

The out-of-finder display unit 43 displays various setting values for the digital camera 1, such as a shutter speed and an aperture value, via an out-of-finder display unit drive circuit 44.

A non-volatile memory 56 is an electrically erasable/recordable memory, and an electrically erasable programmable read-only memory (EEPROM) is used for the non-volatile memory 56, for example. The non-volatile memory 56 stores constants, programs, and the like, for the system control unit 50 to operate.

The system control unit 50 is a control unit including at least one processor or one circuit to control the entire digital camera 1.

The system control unit 50 causes the vibration device 100 to vibrate depending on the image capturing state of the digital camera 1 or a user's operation performed on any of the various kinds of operation units described above.

The system control unit 50 implements processing described below by executing the programs stored in the non-volatile memory 56.

For example, a random access memory (RAM) is used for a system memory 52, and constants and variables for the system control unit 50 to operate, and the programs read from the non-volatile memory 56 are loaded to the system memory 52.

The system control unit 50 also performs display control by controlling the memory 32, the D/A conversion unit 19, the display unit 28, and the like.

A system timer 53 is a timer unit for measuring time to be used for various controls or time of built-in clock.

The mode selection switch 60, a first shutter switch 62, a second shutter switch 64, and the operation unit 70 are operation units for inputting various kinds of operation instructions to the system control unit 50.

The mode selection switch 60 switches the operation mode of the system control unit 50 to any one of a still image capturing mode, a moving image capturing mode, and a reproduction mode.

Examples of modes included in the still image capturing mode include an auto image capturing mode, an auto scene determination mode, a manual mode, an aperture-priority mode (Av mode), a shutter-priority mode (Tv mode), and a program AE mode (P mode).

Examples of the modes further include a custom mode, and various scene modes that are image capturing settings for various scenes. A user can directly switch the mode to any one of the modes with the mode selection switch 60.

Alternatively, the switching can be performed by a user once switching to an image capturing mode list screen using the mode selection switch 60, selecting a mode from a plurality of modes displayed in the list, and switching to the selected mode using another operation member.

Similarly, the moving image capturing mode can also include the plurality of modes.

The first shutter switch 62 turns on in the middle of the operation of the shutter button 61 provided on the digital camera 1, which is so-called a half-press state (image capturing preparation instruction), to output a first shutter switch signal SW1.

The first shutter switch signal SW1 causes the system control unit 50 to start the image capturing preparation operation including AF processing, AE processing, AWB processing, and EF processing.

The second shutter switch 64 turns on when the shutter button 61 is pressed completely, which is so-called a full press state (image capturing instruction), to output a second shutter switch signal SW2.

The second shutter switch signal SW2 causes the system control unit 50 to start a series of image capturing processing from a readout operation from the imaging device 22, to a writing operation of the captured image as an image file in the recording medium 200.

The operation unit 70 includes various operation members for receiving operations from a user.

The operation unit 70 includes at least the following operation units.

The digital camera 1 illustrated in FIGS. 1A and 1B includes the shutter button 61, the electronic main-dial 71, the power switch 72, the electronic sub-dial 73, and the multi-direction key 74.

The digital camera 1 also includes the set button 75, the video button 76, the AE lock button 77, the zoom button 78, the reproduction button 79, and the menu button 81.

A power source control unit 80 includes a battery detection circuit, a direct current to direct current (DC-DC) converter, and a switch circuit for switching blocks to energize. The power source control unit 80 detects the attachment of a battery, a type of the battery, and a remaining battery level.

The power source control unit 80 also controls the DC-DC converter based on the detection result and the instruction from the system control unit 50, to supply a required voltage for a required period to each unit including the recording medium 200.

A power source unit 30 includes a primary battery, such as an alkali battery and a lithium battery, and a secondary battery, such as a nickel-cadmium (NiCd) battery, a nickel-metal hydride (NiMH) battery, and a lithium (Li) battery, and an alternating current (AC) adapter.

A recording medium interface (I/F) 18 is an interface with the recording medium 200, such as a memory card and a hard disk drive.

The recording medium 200 is a recording medium, such as a memory card, for recording the captured image, and configured of a semiconductor memory or a magnetic disk.

A communication unit 54 transmits or receives an image signal and an audio signal through a wireless connection or a wired connection via a wired cable.

The communication unit 54 can be connected to a local area network (LAN) or the Internet. The communication unit 54 can also communicate with an external apparatus using Bluetooth® or Bluetooth® low energy.

The communication unit 54 can transmit an image (including an LV image) captured by the imaging device 22, or an image recorded in the recording medium 200. The communication unit 54 can also receive an image or various kinds of information from an external apparatus.

An orientation detection unit 55 detects an orientation of the digital camera 1 with respect to the gravitational direction.

Based on the orientation detected by the orientation detection unit 55, it is possible to determine whether an image captured by the imaging device 22 is an image captured with the digital camera 1 held in a horizontal direction (landscape direction) or an image captured with the digital camera 1 held in a vertical direction (portrait direction).

An acceleration sensor or a gyroscope sensor can be used for the orientation detection unit 55.

Using the acceleration sensor or the gyroscope sensor, which is the orientation detection unit 55, it is also possible to detect the movement (e.g., panned, tilted, lifted, or remaining still) of the digital camera 1.

The eye-proximity detection unit 57 is an eye-proximity detection sensor for detecting an eye (object) positioned close to the eyepiece portion 16 of the EVF 29 (eye-proximity state) or positioned away therefrom (eye-withdrawal state).

The system control unit 50 switches between display (display state)/non-display (non-display state) of the display unit 28 and the EVF 29 based on the state detected by the eye-proximity detection unit 57.

More specifically, in a state where at least the mode is in an image capturing standby state and the display destination mode is set to auto switching, the display destination is set to the display unit 28 to turn on the display during the eye-withdrawal state, and to turn off the display of the EVF 29.

During the eye-proximity state, the display destination is set to the EVF 29 to turn on the display, and the display unit 28 is turned off.

The touch panel 70*a* and the display unit 28 can be integrally formed as a unit.

For example, the touch panel 70*a* is configured to have a light transmittance not to interfere with the display of the display unit 28, and is attached on an upper layer of a display surface of the display unit 28.

Input coordinates on the touch panel 70*a* and display coordinates on the display screen of the display unit 28 are then associated.

In this way, it is possible to provide a graphical user interface (GUI) that gives a feeling to a user as if the user can directly operate the screen displayed on the display unit 28.

A first embodiment of the present disclosure will now be described with reference to FIGS. 3A to 4C.

Configuration of Imaging Device and Readout Wiring Lines of Imaging Device

Figure 3C:
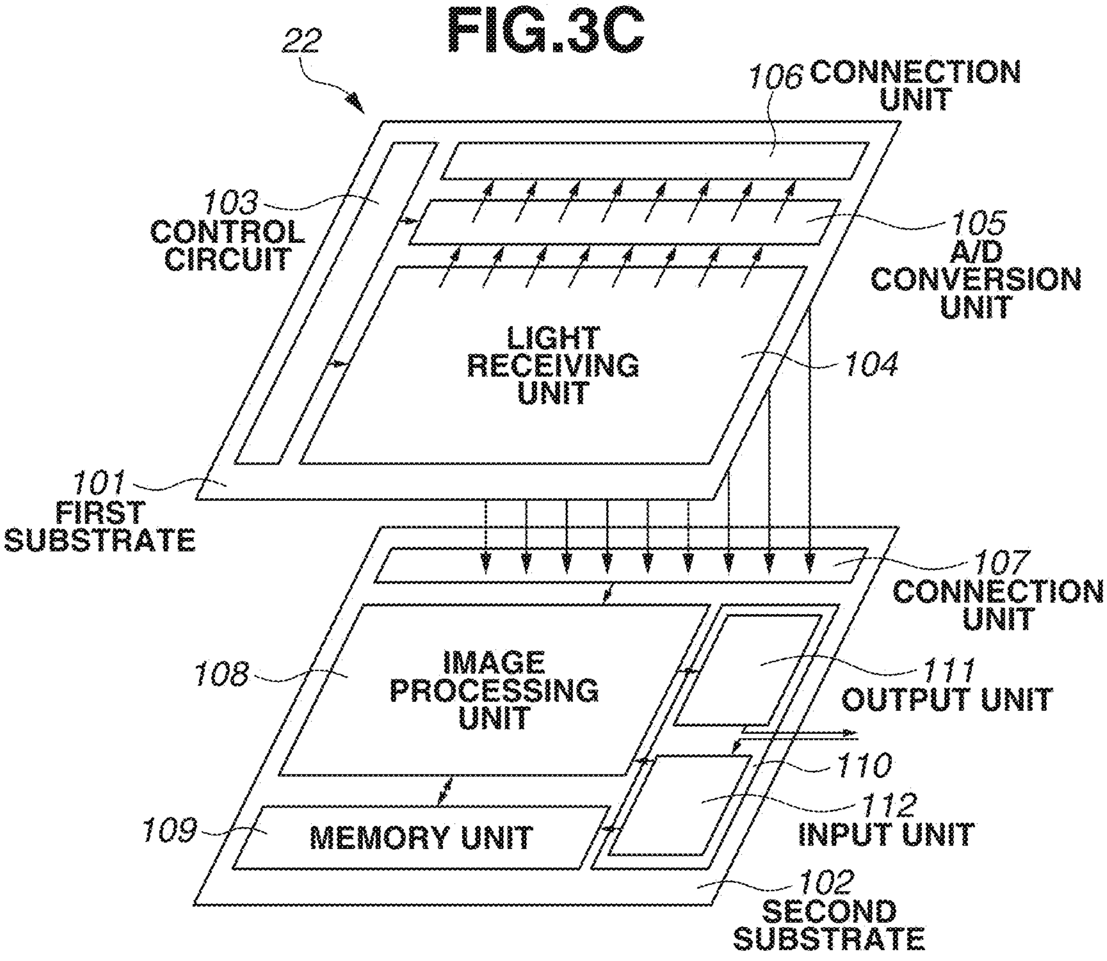

FIGS. 3A and 3B are diagrams illustrating a configuration of an imaging device 500 of the digital camera 1. FIG. 3C is a diagram schematically illustrating a configuration of readout wiring of the imaging device 22.

As illustrated in FIGS. 3A and 3B, the imaging device 500 according to the present embodiment includes the imaging device 22, a frame member 501, a lid 502, a circuit board 504, and connectors 505.

The frame member 501 is outsert-molded with respect to the circuit board 504.

The imaging device 22 is bonded onto the circuit board 504 using an adhesive agent (not illustrated). The imaging device 22 is electrically connected to the circuit board 504 by wire bonding (not illustrated), and the lid 502 is bonded to the frame member 501.

On the circuit board 504, a processing circuit for processing a captured image signal is mounted. A signal processed in the circuit board 504 is transmitted to a main circuit board (not illustrated) via the connectors 505 and a flexible circuit board (not illustrated).

The imaging device 500 illustrated in FIGS. 3A and 3B is illustrated in the same coordinate system as that of the digital camera 1 illustrated in FIG. 1A. When the digital camera 1 is in a normal orientation, a Z direction is an imaging optical axis direction, and a Y direction is a vertical direction.

Figure 3D:
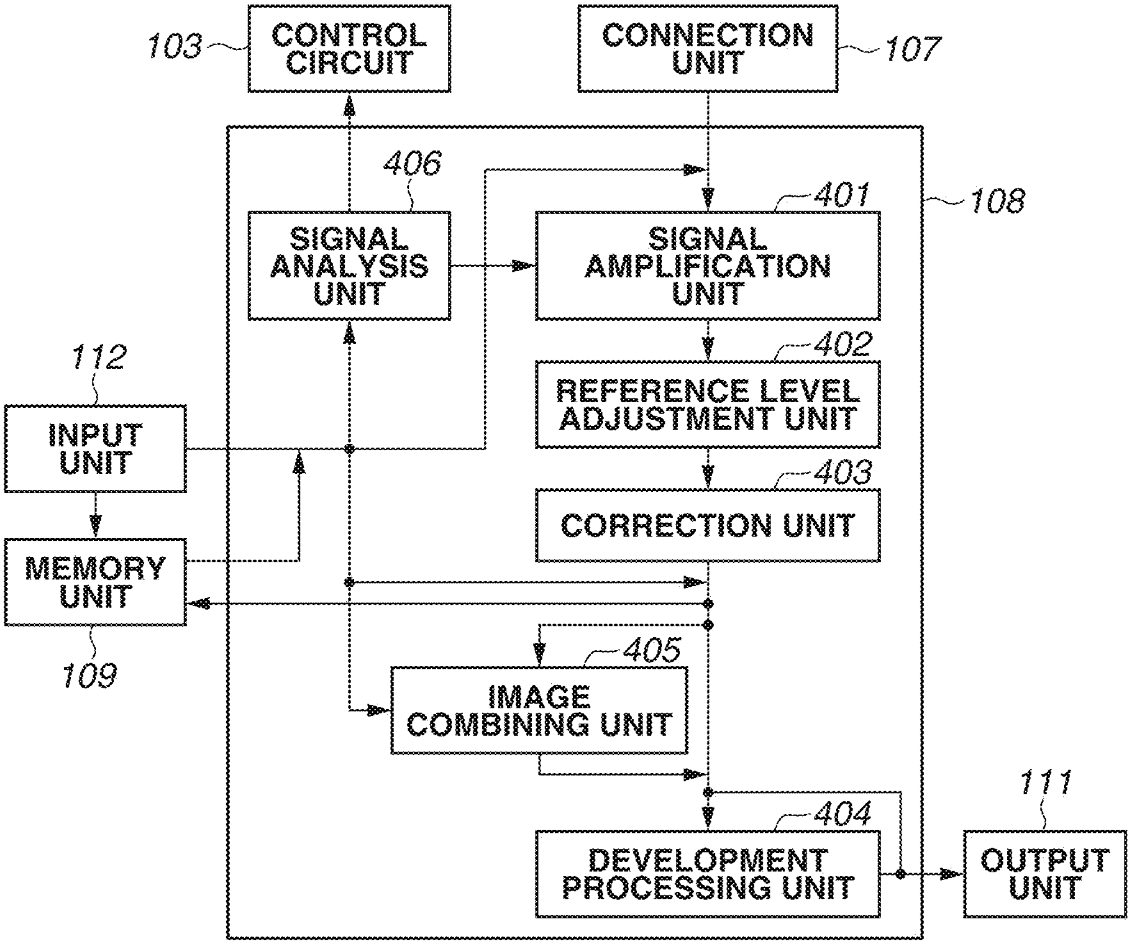

With reference to FIGS. 3C and 3D, a configuration of the imaging device 22 according to the present embodiment will now be described in detail.

FIG. 3C is a block diagram illustrating the configuration of the imaging device 22 according to the first embodiment of the present disclosure.

The imaging device 22 has a configuration in which a first substrate 101 (imaging unit) and a second substrate 102 (processing unit) are layered.

The first substrate 101 and the second substrate 102 are electrically connected between a connection unit 106 in the first substrate 101 and a connection unit 107 in the second substrate 102 via microbumps or via holes.

Although not illustrated, a control circuit 103 in the first substrate 101 and the image processing unit 108 in the second substrate 102 are electrically connected to be communicable with each other.

The first substrate 101 includes a light receiving unit 104, an A/D conversion unit 105, the connection unit 106, and the control circuit 103.

In the light receiving unit 104, a plurality of pixels each including a photoelectric conversion element for converting light into electricity is 2-dimensionally arranged in a row direction and a column direction.

The A/D conversion unit 105 converts an analog image signal generated by the pixels in the light receiving unit 104 into a digital image signal. The connection unit 106 transfers the digital image signal (image data) output from the A/D conversion unit 105 to the second substrate 102.

The control circuit 103 controls various drive operations of the light receiving unit 104 and the A/D conversion unit 105.

The second substrate 102 includes the connection unit 107, the image processing unit 108, the memory unit 109, and the interface unit 110 including the output unit 111 and an input unit 112.

The connection unit 107 receives an image signal transferred from the first substrate 101.

The image processing unit 108 performs various kinds of image processing, such as signal amplification, reference level adjustment, defect correction, and development processing, on the digital image signal (image data) transferred from the first substrate 101, the memory unit 109, or the input unit 112.

The image processing unit 108 includes following functions, in addition to the functions of performing the various kinds of image processing described above.

Specifically, the image processing unit 108 has a function of generating various kinds of composite images, such as a difference image, an addition image, and an average image, by using the captured digital image signal (image data) and the digital image signal (image data) transferred from the input unit 112.

The image processing unit 108 also has a function of generating a moving image by combining a plurality of pieces of image data, using the captured digital image signal (image data) and the digital image signal (image data) transferred from the input unit 112.

The image processing unit 108 further has a function of calculating a luminance value or the like of an object on the bases of the image data transferred from the input unit 112. A configuration of the image processing unit 108 will be described in detail below, with reference to FIG. 3D.

The memory unit 109 temporarily stores the image data transferred from the image processing unit 108 or the input unit 112.

The input unit 112 receives image data from the outside of the imaging device 22 to transfer the received image data to the image processing unit 108 or the memory unit 109. The output unit 111 outputs the image data output from the image processing unit 108 to the outside of the imaging device 22.

In the first embodiment, assume that a terminal through which the image data is output from the interface unit 110 to the outside of the imaging device 22, and a terminal through which the image data is input to the interface unit 110 from the outside of the imaging device 22 are a common terminal.

In the interface unit 110, when image data is input, the terminal of the interface unit 110 is connected to the input unit 112, and when image data is output, the terminal of the interface unit 110 is connected to the output unit 111.

In the imaging device 22, the first substrate 101 (imaging unit), the second substrate 102 (processing unit), and various components included in each of the first substrate 101 and the second substrate 102 are integrally formed as a package.

FIG. 3D is a block diagram illustrating a configuration of the image processing unit 108 of the imaging device 22 according to the first embodiment.

In FIG. 3D, a signal amplification unit 401 applies a predetermined gain to the input digital image signal (image data).

A reference level adjustment unit 402 adjusts a signal level of a digital image signal (image data) to be a predetermined value in a state where the light receiving unit 104 is in a dark state with no incident light.

A correction unit 403 performs various kinds of correction processing, such as defect correction processing and dark shading correction processing, on the image data.

A development processing unit 404 performs development processing after a white balance adjustment is performed on the image data.

An image combining unit 405 generates various kinds of composite images, such as a difference image, an addition image, and an average image, using the image data captured by the light receiving unit 104 and read out from the A/D conversion unit 105, and the image data transferred from the input unit 112 or the memory unit 109.

A signal analysis unit 406 analyzes the image data transferred from the input unit 112 or the memory unit 109.

Based on the analysis result, a signal amplification ratio of the signal amplification unit 401 is set, and the control circuit 103 makes various kinds of drive settings of the light receiving unit 104 and the A/D conversion unit 105.

Figure 3E:
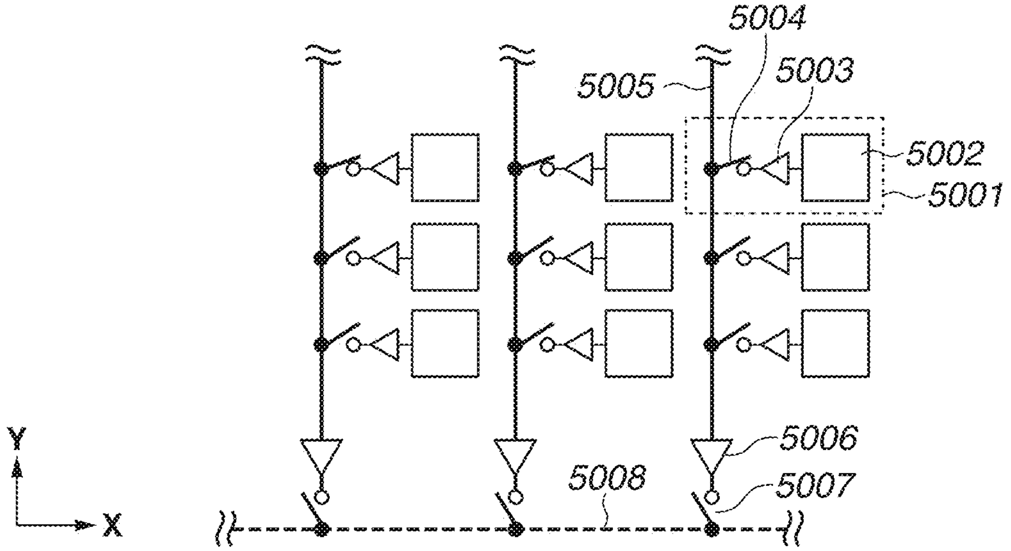

FIG. 3E is a diagram schematically illustrating a configuration of the readout wiring lines of the imaging device 22 according to the present embodiment.

Light received by a photodiode 5002 is accumulated as a charge and amplified by a pixel amplifier 5003.

The amplified signal having passed through the vertical signal line (readout wiring line) 5005 is amplified by a column circuit amplifier 5006 at an on-timing of a pixel selection switch 5004. The amplified signal then joins a horizontal signal line 5008 at an on-timing of a column selection switch 5007.

An area surrounded by dashed lines is treated as one pixel as a pixel 5001.

In this case, at a readout timing of the charge from the pixel 5001 through the vertical signal line 5005, a plurality of the pixels 5001 arranged in a row in an X direction at a same time, and the readout rows are sequentially read out in a Y direction.

This is a readout method matching the traveling direction of a focal plane shutter curtain (not illustrated) mounted on a conventional camera.

Since the vertical signal line 5005 according to the present embodiment is arranged in the approximately Y direction of the digital camera 1, the expression of "vertical" is used.

The readout direction can be the horizontal direction (X direction in FIGS. 3A and 3E) or the optical axis direction (Z direction in FIG. 3A) as appropriate, depending on the aspect ratio of the imaging device 22 or the layered structure of the imaging device 22.

Layout of Vibration Device

Figure 4A:
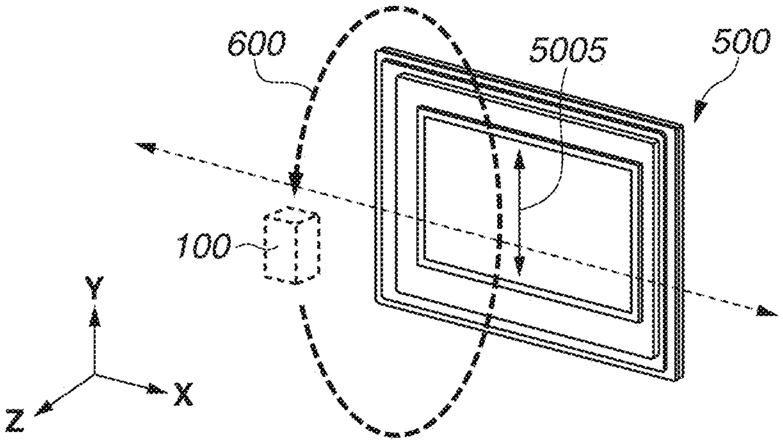
FIGS. 4A, 4B, and 4C are diagrams schematically illustrating a layout direction of the vibration device with respect to the imaging device.
Figure 4B:
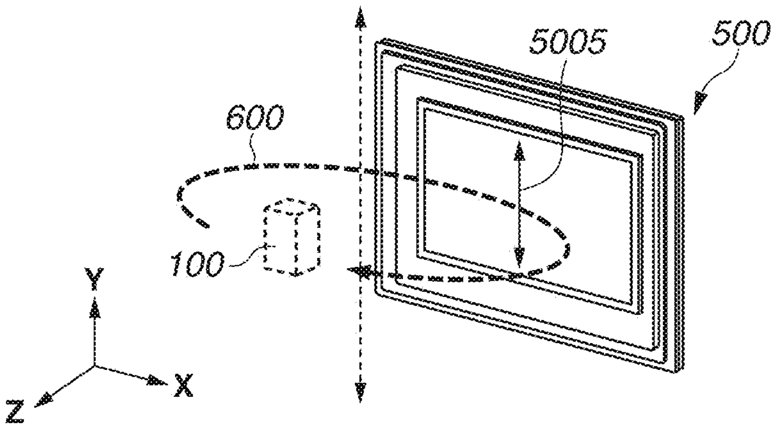

With reference to FIGS. 4A and 4B, a layout of the vibration device 100 will be described.

FIG. 4A illustrates a state of a leakage magnetic flux 600 in a case where the vibration direction of the vibration device 100 is set in the approximately Y direction of the digital camera 1.

FIG. 4B illustrates a state of the leakage magnetic flux 600 in a case where the vibration direction of the vibration device 100 is set in the approximately X direction of the digital camera 1.

The vibration device 100 uses a linear vibrator in the present embodiment, and causes a coil to generate an electromagnetic force in a vibration direction vector to vibrate the vibration element 100*a*.

In other words, the vibration device 100 employs a configuration in which the leakage magnetic flux 600 is strong in the vibration direction. In a case where an electromagnetic force generation direction and the vibration direction of the vibration element 100*a* are different, it shall not be applied thereto, and the layout is determined depending on the electromagnetic force generation direction.

Depending on the vibration device, there may be a case where the vibration device 100 has two electromagnetic force generation directions, but the layout is possible using a method satisfying conditions in FIGS. 4A. 4B, and 4C described below.

While the vibration device 100 is being driven, an induced electromotive force is generated in the orthogonal direction to the leakage magnetic flux 600. The induced electromotive force vector at this time is illustrated with a dotted line arrow in each of FIGS. 4A, 4B, and 4C.

In particular, when the induced electromotive force is generated while the readout through the vertical signal line 5005 is performed, noise is also amplified by the column circuit amplifier 5006, and thus the influence on the image becomes strong.

For this reason, in the whole image capturing sequence, an external generation of the magnetic noise is desirably reduced especially at the readout timing through the vertical signal line 5005.

In a case where the vertical signal line 5005 and the induced electromotive force vector generated due to the leakage magnetic flux 600 are orthogonal as illustrated in FIG. 4A, the influence of the induced electromotive force on the vertical signal line 5005 is small, and noise is less added thereto in the readout of the imaging device 22.

In contrast, in a case where the vertical signal line 5005 and the induced electromotive force vector direction generated due to the leakage magnetic flux 600 are in the same direction as illustrated in FIG. 4B, the influence of the induced electromotive force due to the leakage magnetic flux 600 is large on the vertical signal line 5005.

In the imaging device 22, in a case where a signal readout timing from the pixel 5001 and a drive timing of the vibration device 100 overlap each other, noise can be generated on the captured image due to the induced electromotive force caused by the leakage magnetic flux 600.

In general, this is a phenomenon referred to as an induction noise.

Figure 4C:
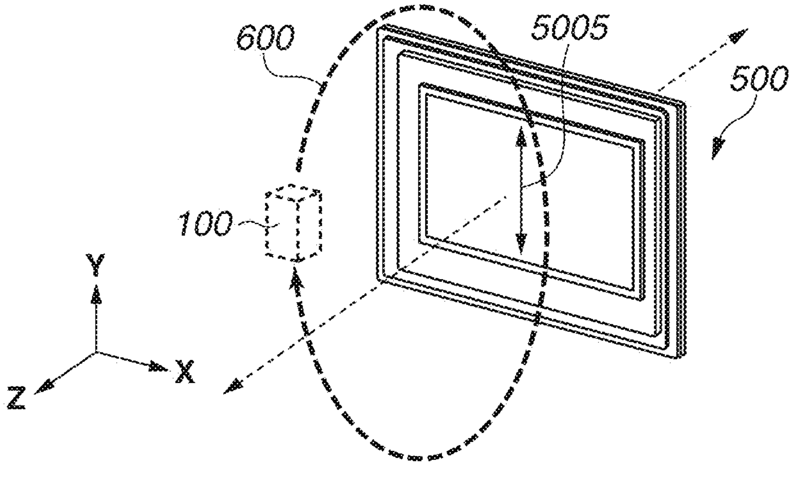

FIG. 4C illustrates a state of the leakage magnetic flux 600 in a case where the vibration direction of the vibration device 100 is set in the approximately Z direction of the digital camera 1.

When Multilayer Type CMOS Sensor is Used

Similarly to the state in FIG. 4A, the induced electromotive force (dotted line arrow) generated due to the leakage magnetic flux 600 is orthogonal in direction to the vertical signal line 5005, and thereby the induction noise is not easily generated.

In a case where the imaging device 22 is, for example, a multilayer type CMOS sensor, however, there may be a case where a part of the readout wiring lines is formed in the Z direction, and the induction noise tends to be generated due to the induced electromotive force (dotted line arrow) in the Z direction illustrated in FIG. 4C.

For this reason, the induced electromotive force (dotted line arrow) generated due to the leakage magnetic flux 600 is desirably oriented to the X direction as illustrated in FIG. 4A.

The multilayer type CMOS sensor has a structure in which a chip with a signal processing circuit formed thereon instead of a support substrate for a rear surface irradiation type CMOS sensor is used, and a pixel portion of the rear surface irradiation type CMOS sensor is layered on the chip.

The multilayer type CMOS sensor is advantageous in that a large scale circuit can be mounted with a small chip size, and a pixel portion and a circuit portion can be produced each using a dedicated process.

Using a layering technique, a layer of photodiodes and a layer of pixel transistors conventionally formed on a same substrate are formed separately on different substrates and layered.

In this way, the structure in which each layer is optimized can be employed, and a saturation signal level of about two times the conventional level can be secured, which contributes to the expansion of the dynamic range.

Further, pixel transistors including reset transistors (RST), selection transistors (SEL), and amplifier transistors (AMP) other than transfer gates (TRG) are formed on a layer different from a layer on which the photodiodes are arranged.

Accordingly, the size of the amplifier transistor can be expanded, and it is possible to considerably reduce the noise that tends to occur when a dark place such as a night scene is captured.

A typical CMOS sensor (e.g., rear surface irradiation type CMOS sensor) that is not the multilayer type CMOS sensor may employ any of the structures illustrated in FIGS. 4A and 4C.

In a case where only the influence of the induction noise is considered, however, the typical CMOS sensor (e.g., rear surface irradiation type CMOS sensor) desirably has the configuration illustrated in FIG. 4A.

In the present embodiment, by arranging the vibration device 100 as in FIG. 4A or FIG. 4C, the vibration can be provided to a user while the influence of the noise to the captured image being reduced, even during the image capturing operation.

Many types of configurations are proposed for the vibration device 100, and the layout method described above can be applied depending mainly on the generated leakage magnetic flux direction and its induced electromotive force vector, without the relationship between the vibration direction and leakage magnetic flux being limited.

Vibration Timing of Vibration Device

Vibration timing of the vibration device 100 according to the present embodiment will now be described with reference to timing charts illustrated in FIGS. 5A to 5C.

Figure 5A:
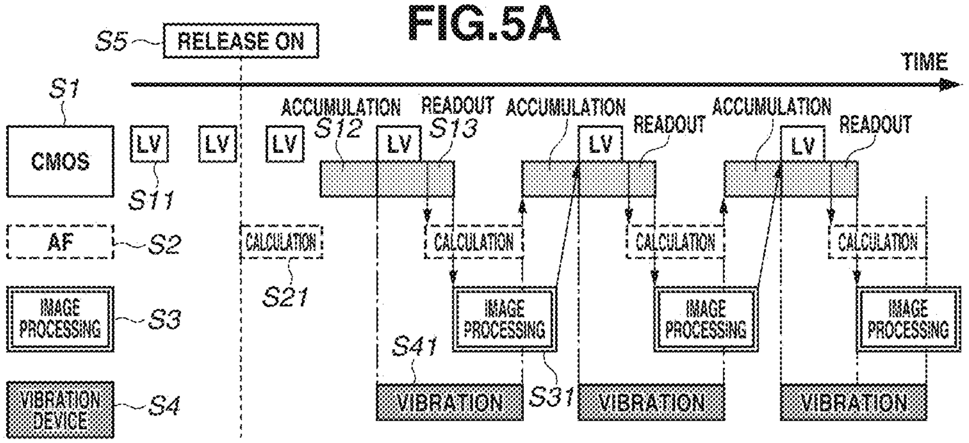
FIGS. 5A, 5B, and 5C are timing charts each illustrating a vibration timing of the vibration device.

FIG. 5A is a timing chart illustrating a case where the vibration device 100 is caused to vibrate during the readout period of the imaging device 22.

S1 illustrates an operation state of the CMOS sensor as the imaging device 22. S2 illustrates an AF operation state of the focus detection unit 11 of the imaging device 22.

S3 illustrates an operation state of the image processing unit 24 where the image data obtained by the imaging device 22 is processed. S4 illustrates an operation state of the vibration device 100.

In a state where power of the digital camera 1 is on, the CMOS sensor is driven intermittently to obtain display images to perform an LV display on the EVF 29 or the display unit 28 (LCD screen) as in S11.

At this time, in S5, when a release operation is detected, the image obtaining operation by the CMOS sensor starts. In S21, an AF calculation for the first frame is performed.

In S12, the CMOS sensor performs the accumulation (exposure) of an image signal. In S13, the image signal is read out. In S31, the readout image signal (data) is subjected to image processing.

At this time, at a timing at which the image accumulation in S12 is completed, in S41, the vibration device 100 starts to vibrate.

This operation is performed to prevent an occurrence of blur of the captured image caused by the vibration during the image accumulation. By providing a vibration halt period, a user can recognize a period between the frames in continuous image-capturing, accordingly.

In a case where the vibration of the vibration device 100 does not affect the blur of the captured image because of the configuration of the digital camera 1, it is possible to vibrate the vibration device 100 during the image accumulation period in S12.

By overlapping the image readout timing in S13 and the vibration timing of the vibration device 100 in S41, the vibration period can be made long.

As described with reference to FIGS. 4A, 4B, and 4C, the influence of the noise to the captured image can be reduced by arranging the vibration device 100 at the position possible to reduce the influence of the magnetic noise.

Figure 5B:
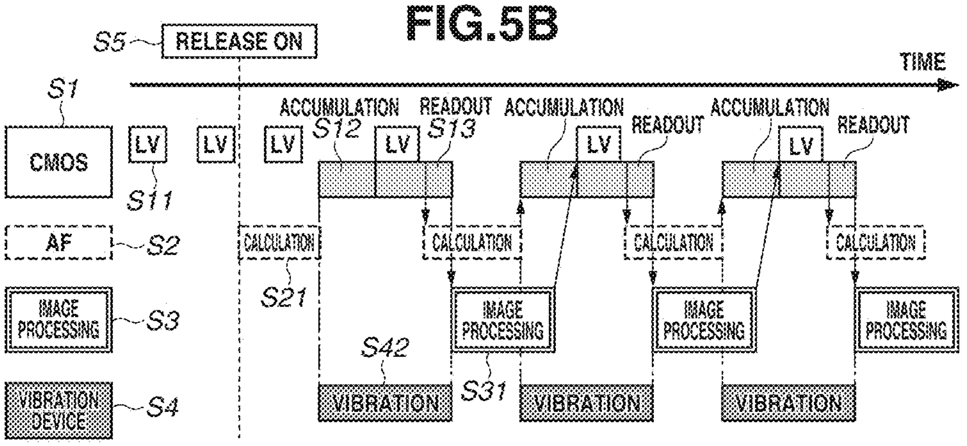
Figure 5C:
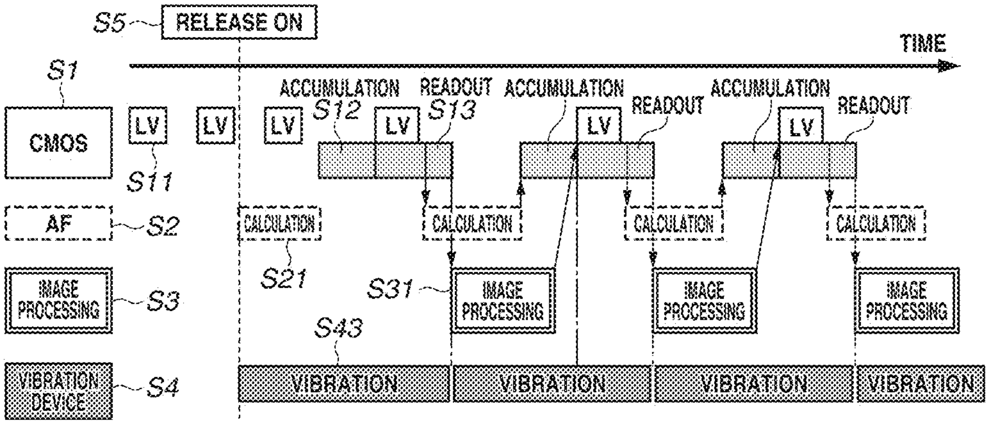

FIGS. 5A, 5B, and 5C each illustrate a state where the release operation is continuously performed, i.e., is a sequence of a continuous image capturing, but the sequence can be applied equally to a case of a single image capturing.

A user can recognize the start of the image capturing by the generation of the vibration at the release operation start time in silence as described above.

Since the digital camera 1 that employs an electronic shutter does not generate a mechanical sound associated with the image capturing operation of the imaging device 22, it is desirable to cause a user to recognize the release operation start as a tactile sensation by vibrating the vibration device 100.

The notification method using voice or sound has been widely used, but it is possible to notify the user of the release operation start using vibration, even in a state where the user does not desire to generate sound.

FIG. 5B is a timing chart illustrating a case where the vibration is caused during the accumulation period and the readout period of the imaging device 22.

By setting each vibration period illustrated in S42 to be in an accumulation period and a readout period of the imaging device 22, a pseudo vibration can be generated at a vibration timing similar to a vibration timing of the mechanical shutter mechanism used in the conventional digital camera.

Even with a digital camera with no mechanical shutter mounted, the vibration that a user is feeling at a time of release operation can be favorably imitated.

FIG. 5C is a timing chart illustrating a case where the vibration is caused through the entire period including the accumulation period and the readout period of the imaging device 22.

As illustrated in S43, the vibration is caused to start at a timing of the shutter release ON, and the vibration is caused to generate through the entire period of obtaining each image frame.

In this case, for example, during a period before the accumulation start, a vibration corresponding to a vibration of the first curtain of the mechanical shutter mechanism is generated. During a period after the accumulation, a vibration corresponding to a second curtain is generated.

In this way, a user can obtain a vibration feeling similar to that obtained by the conventional digital camera having the mechanical shutter mechanism mounted.

The operation of vibrating the vibration device 100 a plurality of times or changing the vibration intermittently during a vibration generation possible period can be more easily performed as the vibration generation possible period is longer in the image capturing sequence.

The content described above is an example of imitating the vibration of the mechanical shutter mechanism. By changing the vibration feeling based on a state of the digital camera 1 or a magnitude of the setting value, a difference of the state of the digital camera 1 can also be transmitted using a difference of the vibration state.

As an example of the vibration feeling, it is possible to imitate a click feeling of a physical switch.

Since the pseudo feeling is generated by changing the vibration intensity and the interval during the vibration time period, a vibration time period of about 200 milliseconds (msec) or more is required.

In a case where the vibration control according to the present embodiment is not used, the vibration possible time period of the digital camera 1 is about several tens of milliseconds. It is thus difficult to generate a vibration feeling imitating the click feeling described above with this time period.

In a case where the vibration generation time period is to be secured without using the configuration according to the present embodiment, the image capturing time interval by the imaging device 22 needs to be increased to avoid the influence of the magnetic noise, leading to an adverse effect that a continuous image capturing speed is reduced.

The case where the embodiment of the present disclosure is applied to a digital camera is described above as an example, but it is not limited to this example. The embodiment can be applied to any imaging apparatus having a vibration device mounted thereon.

The disclosure of the present embodiment includes the following configurations and methods.

Configuration 1

An imaging apparatus 1 including an imaging device 22, an operation unit 70 configured to instruct an image capturing start of the imaging device 22, a vibration device 100, a control unit 50 configured to feedback a tactile sensation to a user by operating the operation unit 70 to vibrate the vibration device 100, and a plurality of readout wiring lines 5005 configured to read out information from pixels 5001 in the imaging device 22, wherein, in a case where the control unit 50 performs a feedback control of the tactile sensation using the vibration device 100 during the readout period of the image signal from the imaging device 22 in the image capturing sequence, the readout wiring lines 5005 are arranged in such a manner that a direction Y in which the information is read out from the pixels 5001 in the imaging device 22 is parallel with a vibration direction Y of the vibration device 100 (see FIGS. 4A and 4C).

Configuration 2

The imaging apparatus 1 according to the configuration 1, wherein an induced electromotive force vector generated due to a leakage magnetic flux 600 generated at a vibration time of the vibration device 100 has a vector X parallel with an imaging plane of the imaging device 22.

Configuration 3

The imaging apparatus 1 according to the configuration 1 or 2, wherein in the image capturing sequence, the control unit 50 does not perform the feedback control of the tactile sensation using the vibration device 100 during an accumulation period of the image signal by the imaging device 22 (see FIG. 5A).

Configuration 4

The imaging apparatus 1 according to any one of the configurations 1 to 3, wherein the control unit 50 starts the feedback control of the tactile sensation using the vibration device 100 after the operation unit 70 is operated, continues the feedback control of the tactile sensation during the image capturing sequence, and ends the feedback control of the tactile sensation before starting the next image capturing sequence (see FIGS. 5B and 5C).

Configuration 5

The imaging apparatus 1 according to any one of the configurations 1 to 4, wherein the imaging device 22 is a layered type sensor.

Configuration 6

The imaging apparatus 1 according to any one of the configurations 1 to 4, wherein the readout wiring lines 5005 of the imaging device 22 are arranged parallel with a substrate surface on which the imaging device 22 is mounted, and wherein an induced electromotive force vector generated due to a leakage magnetic flux 600 generated at a vibration time of the vibration device 100 has a vector Z perpendicular to an imaging plane of the imaging device 22 (see FIG. 4C).

The present disclosure is applicable to a cross reality (XR) related apparatus including a mixed reality (MR) apparatus, a personal computer (PC), a personal digital assistant (PDA), a portable telephone terminal, or portable image viewer, with a vibration device mounted thereon.

The present disclosure is also applicable to a digital photo frame, a music player, a game machine, an electronic book reader, a tablet terminal, a smartphone, and the like, with an image capturing control function. The present disclosure is not limited to these embodiments, and can be modified and changed in various manners within the scope of the present disclosure.

According to the present disclosure, it is possible to transmit a vibration to a user at an appropriate timing during an image capturing operation, while reducing an influence of a magnetic noise generated due to the vibration of a vibration device, to a captured image.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

What is claimed is:

1. An imaging apparatus comprising an imaging device;

an operation unit configured to instruct an image capturing start of the imaging device;

a vibration device;

a control unit configured to control vibration of the vibration device; and a plurality of readout wiring lines configured to read out information from pixels in the imaging device, wherein the readout wiring lines are not parallel to the direction of the magnetic flux of the vibration device.

2. The imaging apparatus according to claim 1, wherein the readout wiring lines is perpendicular to the magnetic flux of the vibration device.

3. The imaging apparatus according to claim 2, wherein the imaging device is a layered type sensor.

4. The imaging apparatus according to claim 1, wherein in a case where the control unit performs a feedback control of the tactile sensation using the vibration device during a readout period of an image signal from the imaging device in an image capturing sequence, the readout wiring lines are arranged in a direction parallel with a vibration direction of the vibration device.

5. The imaging apparatus according to claim 4, wherein in the image capturing sequence, the control unit does not perform the feedback control of the tactile sensation using the vibration device during an accumulation period of the image signal by the imaging device.

6. The imaging apparatus according to claim 4, wherein the control unit starts the feedback control of the tactile sensation using the vibration device after the operation unit is operated, continues the feedback control of the tactile sensation during the image capturing sequence, and ends the feedback control of the tactile sensation before starting a next image capturing sequence.

7. The imaging apparatus according to claim 1, wherein an induced electromotive force vector generated due to a leakage magnetic flux generated at a vibration time of the vibration device has a vector parallel with an imaging plane of the imaging device.

8. The imaging apparatus according to claim 1, wherein the readout wiring lines of the imaging device are arranged parallel with a substrate surface on which the imaging device is mounted, and wherein an induced electromotive force vector generated due to a leakage magnetic flux generated at a vibration time of the vibration device has a vector perpendicular to an imaging plane of the imaging device.

* * * * *